March 11, 1941. C. C. GULDBECH 2,234,525
APPARATUS FOR FORMING TWIST DOUGH
Filed May 3, 1940 2 Sheets-Sheet 1
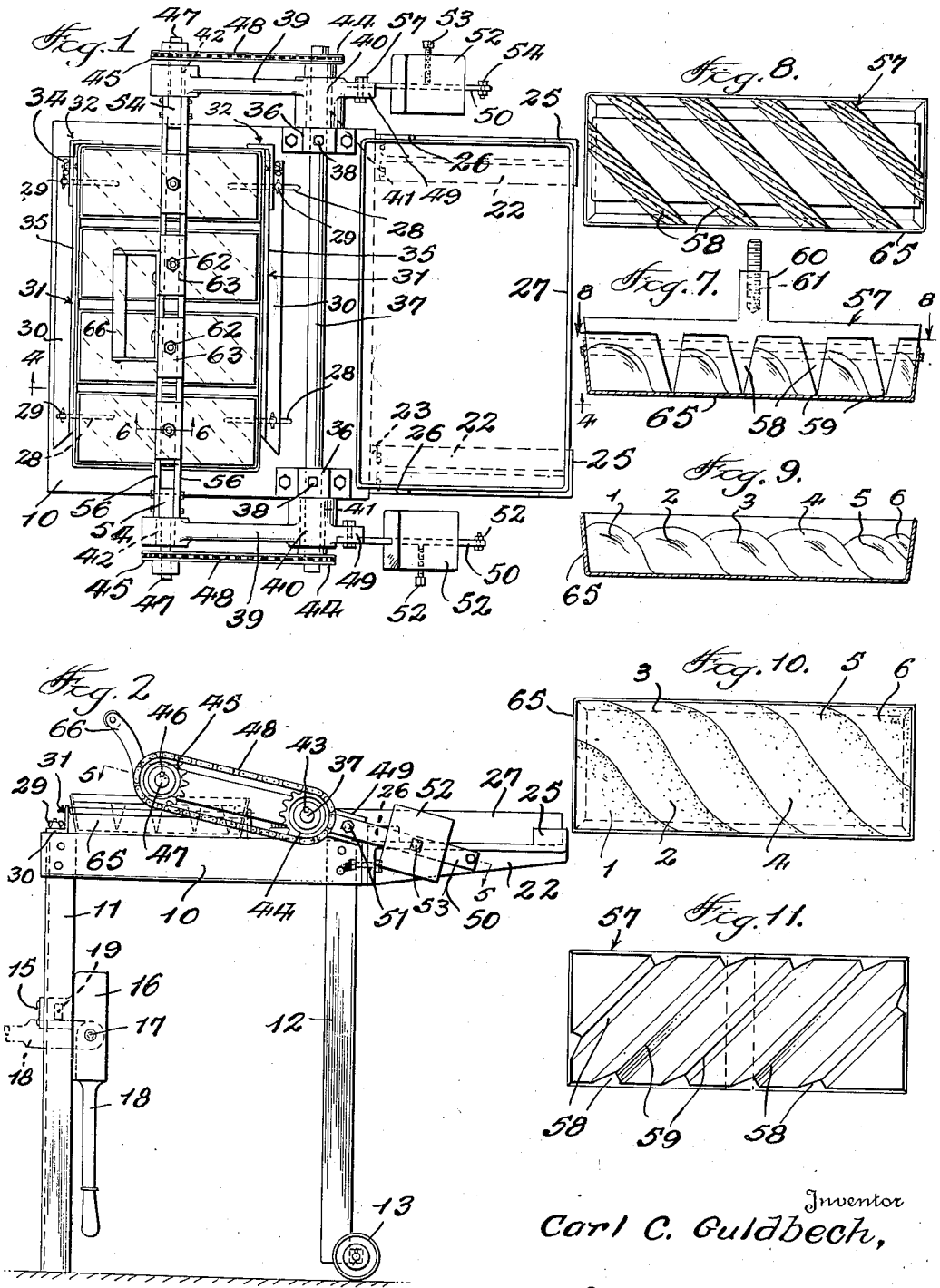
Inventor
Carl C. Guldbech,
By Christian R. Nielsen
Attorney

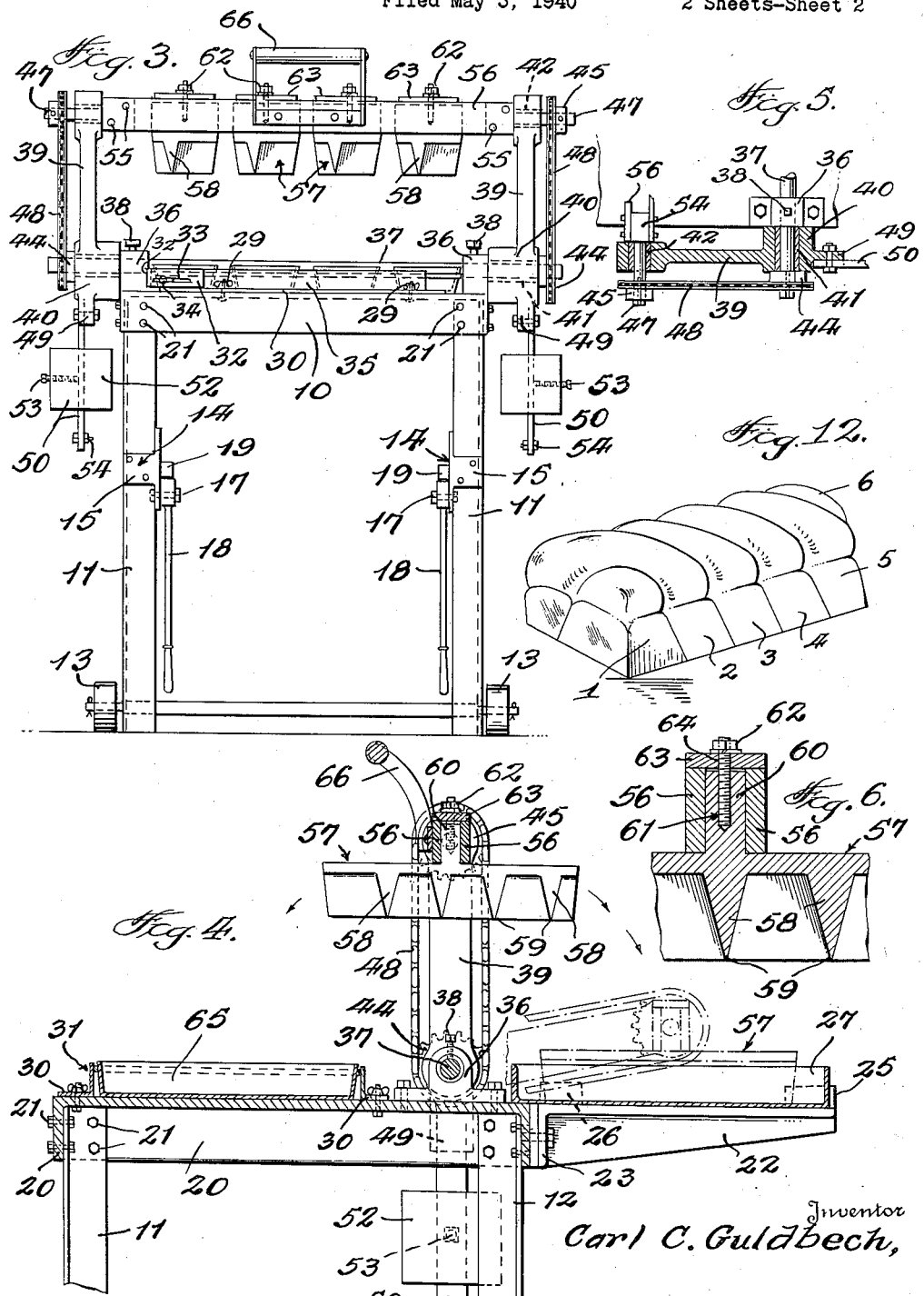

Patented Mar. 11, 1941

2,234,525

UNITED STATES PATENT OFFICE 2,234,525

APPARATUS FOR FORMING TWIST DOUGH

Carl C. Guldbech, Bronx, N. Y.

Application May 3, 1940, Serial No. 333,224

9 Claims. (Cl. 107—21)

This invention relates to an apparatus for twisting dough, and more particularly to a means in which the dough itself effects the action, after deposition and severing of the dough in the baking pans.

It is the cardinal object of the invention to provide a novel and simple apparatus for cutting the dough into a desired number of segments, while in the pan, and allowing the twisting action of the dough, due to molecular and fiber displacement of the dough during proofing to effect the twist to the dough.

It is a specific object of the invention to provide a novel construction of die for cutting the dough into a plurality of segments, while in the bake pans, and to provide cooperative mechanism for returning the die member to an inoperative position after severing the dough.

It is also an object of the invention to provide a novel construction of machine of the type described, in which means are provided for readily flouring the die to prevent sticking of the dough to the die.

It is a still further object of the invention to provide a machine for forming twisted dough in which a plurality of dough pieces may be severed in individual pans in a single operation and in which the cutting dies may be floured as found necessary.

A further object of the invention is the provision of means insuring the positive movement of the die members at right angles to penetration and cutting of the dough, as well as similar movement into and out of a flour dusting pan.

It is also an object of the invention to provide a machine which may be readily adjusted to cut formed dough of various lengths, thus permitting its use upon standard or over standard lengths of dough.

Additional objects, advantages and features of invention will be apparent from the following description and accompanying drawings, wherein Figure 1 is a top plan view of my machine.

Figure 2 is a side elevation thereof.

Figure 3 is a front view thereof.

Figure 4 is an enlarged cross section on the line 4—4 of Figure 1.

Figure 5 is a longitudinal section on the line 5—5 of Figure 2, illustrating the means for controlling the operation of the die members.

Figure 6 is an enlarged fragmentary cross section illustrating the die mounting and assembly means taken on the line 6—6 of Figure 1.

Figure 7 is a side elevation of a die within a pan illustrating the cutting operation of the dough.

Figure 8 is a sectional view on the line 8—8 of Figure 7.

Figure 9 is a sectional view of a pan with the severed dough therein.

Figure 10 is a top plan view of the dough, illustrating approximately the twist of the dough after steam proofing.

Figure 11 is a bottom plan view of one of the die members.

Figure 12 is a perspective view of a loaf of bread formed and baked in accordance with the present machine and method.

Heretofore, numerous attempts have been made to produce twist bread by mechanical means which have consisted in actually twisting pairs of formed dough, prior to baking, but such machines have been of more or less expensive construction, and in many instances produced bread which is not of uniform texture, due to the fact that the gas cells of the dough are not sufficiently and uniformly broken down during the twisting action of the dough.

In order to overcome the above, as well as other difficulties, I have conceived and put into actual practice, a method and means for twisting formed dough by employing the molecular changes of the dough during proofing to effect the twisting of the dough.

A preferred machine for carrying out the method is disclosed in the accompanying drawing wherein there is shown a rectangular member 10 supported upon upright legs 11 and 12, there being an upright at each corner of the frame. The uprights 11 will be defined as the front legs while the ones 12 will be considered the rear legs, and these latter legs will be provided with rollers 13 for ready transport of the machine as will be described hereinafter.

Intermediate the height of the front legs 11 a casting 14 is bolted or otherwise secured, comprising an angle plate 15 adapted to snugly fit upon the leg for securement thereto with which there is integrally formed a body portion 16, the latter being preferably disposed upon the inner side of the legs so as to avoid undesirable projecting portions, and has an ample length so as to have a substantial contacting area with the leg. A pivot bolt 17 is mounted in the body 16 at a point below the plate 15 and swingably fixed to the bolt there is a handle 18. A stop lug 19 is integrally formed upon each of the body members 16 arranged in the path of upward swinging movement of the handles 18, the lugs 19 being vertically positioned so as to limit the upward movement of the handles when they reach a horizontal position with respect to the legs 11. It will thus be seen that the machine may be readily transported by merely tilting the front end of the machine so as to place the load on the rollers 13. Upon release of the handles 18 they will fall to the inoperative position as shown in Figure 2.

The base member 10 is shown as an inverted boxing, the flanges 20 of which afford means for rigidly securing the legs 11 and 12 by bolts 21.

Upon the flange 20 at the rear of the base 10 a pair of brackets 22 are fixed, this being accomplished in the provision of flanges 23 complemental to the flange 20 and bolts 24 threadedly engaged in tapped holes in the flanges 20.

The brackets 22 are spaced longitudinally apart approximately the width of the machine and at the projecting ends thereof upstanding angular flanges 25 are formed. Upstanding flanges 26 are provided on each of the brackets at the points of attachment to the base 10, extending longitudinally of the brackets and aligned with an edge of the angle flange 25. The flanges 25 and 26 form means for centering and maintaining a dusting pan 27 against movements when placed upon the brackets, for a purpose as will appear as the description proceeds.

The base 10 has a pair of slots 28 inwardly of each end thereof through which a lock bolt 29 is mounted, the bolt passing through an aperture formed in the flange 30 of a pan guide 31. The slots 28 extend parallel to respective ends of the base, and it will therefore be apparent that guides 31 will be adjusted longitudinally along the slots to accommodate different lengths of bake pans. In order to accommodate pans of differing widths, there is provided an adjustable end wall 32. The wall is of angular formation, one leg of which is slotted as at 33, and receives a lock bolt 34 therethrough, the bolt being carried by the vertical wall 35 of the pan guide 31. The other leg of the angle 32 is extended inwardly in the path of movement of pans to be placed on the base, thus functioning to stop and center the pans as is required.

Upon the base 10, inwardly of its rear edge there is mounted a pair of aligned bearings 36, through which a shaft 37 is extended and fixedly secured against rotation, by means of lock bolts 38. The shaft 37 projects from the bearings 36, and swingably mount respective arms 39. The arms comprise a hub 40 within which a wood bushing 41 is seated, the bushing being impregnated with a lubricant. The free end of the arms 39 are also provided with a bushed bearing 42 similarly impregnated. By impregnating the bearings, the need for grease cups or other lubricating means is avoided, thereby eliminating contamination of dough when being worked upon.

Each end of the shaft 37 has keyed thereon, as at 43, a small sprocket 44, and a similar sprocket 45 is keyed, as at 46, to a stud shaft 47, journalled in the bushings 42 of the arms. A sprocket chain 48 is trained about respective sprockets 44 and 45, for a purpose presently to be explained.

The hubs 40 each have a projecting longitudinally recessed lug 49 receiving a flat rod 50 which is secured therein by means of a bolt 51. A counter-weight 52 is adjustably mounted upon each of the rods 50, and may be secured in adjusted positions by means of a set screw 53. A bolt 54 fixed to the lower end of the rods 50 prevents accidental displacement of the counter-weights.

The stud shafts 47 are integrally formed with a machined body portion 54 of angular formation upon opposed faces of which there are bolted as at 55, respective flat steel bars 56, the bars being extended between and connected to the body portions 54 of respective stud shafts 47, so that the shafts 47 will move in unison upon swinging movement of the arms 39. In addition, the bars 56 function for support of the cutting dies as will now be explained.

Attention is now invited to Figures 6, 7, 8, 9, 10 and 11, for an understanding of the construction of the cutting dies, generally indicated at 57. In the present instance, the machine is illustrated as embodying a gang of four cutting dies, but this is not arbitrary, since the number of dies employed depends entirely upon the capacity of the machine. Since the dies are of identical construction, a description of one will be sufficient for an understanding of the construction, attention being directed to Figures 7 and 11.

As shown the die 57 is of rectangular shape of a size less than the bake pan with which it co-operates, and since the standard pans have slightly inclined walls, the sides of the die will have similarly inclined edge faces and cutting blades 58.

The blades 58 are formed integral with the body portion of the die, and are angularly arranged, spaced longitudinally upon the under face of the body. The blades 58 taper from the body of the die to define a cutting edge 59, and preferably the blades of the die are inclined at such angle that one end of the end blades intersect an end of the body above the longitudinal axis of the body. In the present instance, the die is shown as having five cutting blades, and when such a die is employed in severing a formed roll of dough, six individual pieces of dough result, as indicated by the numerals 1 to 6 in Figures 9 and 10, and therefore the finally baked loaf will show demarkations of the several pieces, as shown in Figure 12.

The die 57 has a transverse extended upstanding lug 60 of a width and machined to fit between the bars 56 (see Fig. 6) and of a height slightly less than the height of the bars 56. The lug 60 is provided with an opening 61 medially of the lug 60 suitably tapped for threaded engagement of a bolt 62.

In order to secure the cutting dies 57 to the bars 56, the lugs 60 are inserted between the bars, a draw plate 63 being positioned above and resting upon the bars, there being one draw plate for each die. Each plate 63 is apertured as at 64, and aligned with the aperture of the lug. It is now only necessary to insert the bolt 62 into the aligned apertures and screw the bolt partly into the tapped aperture 61. The final securement and centering of the cutting dies will now be explained.

It may now be explained that the die members 57 are adapted to be swung from its raised position, as shown in Figure 4, to a position within the bake pans indicated at 65 for effecting the cutting operation, or into the flour dusting pan 27. While no great accuracy is required in placement of the flour pan 27, since the pan may be made sufficiently large to accommodate the dies, adjustment of the dies with respect to the bake pans is essential, in order that the dies may function properly with their respective pans.

Customarily, four pans 65 are considered a unit, and therefore four die members are employed, one for each pan. To obtain proper registration of the dies 57 with the pans, the handle 66 fixed to the outermost bar 56, is grasped and the arms 39 and associated dies 57 are drawn downwardly until the dies are positioned above the open pans 65. Should longitudinal adjustment of the dies be found necessary, the lugs 60 and associated die may be slid in the proper direction so that the die will properly register with its pan 65. It is then only necessary to tighten the bolt 62, which will draw the die snugly against the bars 56 for rigid retention thereof. The mounting and securement of the dies also makes it possible to readily replace the dies when needed, or to install oversize dies for use in cutting other than standard rolls of formed dough. In the latter event, it will also be necessary to adjust the pan guides 31 to accommodate the larger sized pans.

Obviously it will be necessary that the cutting dies 57 enter the pans 65 at right angles in order to properly sever the formed dough contained therein and this is accomplished through the gears 44, 45 and chain 48. As has been explained, the shaft 37 is fixed against rotation, and since the gears 44 are keyed thereto, these two elements are held stationary. The sprockets 45 are also fixed to the stud shaft 47 against rotation, but the arms 39 are free to partake of swinging movement upon the shafts 37 and 47. Thus, when the die mechanism is rocked to either side of the vertical position, the links of the chain 48 merely engage successive teeth of the sprockets without effecting rotation of the shafts 37 and 47. The dies 57 will thus be held to a true course so as to enter the pans 27 and 65 at right angles.

The operation will be substantially as follows: The operator will place a gang of pans 65 upon the base 10, the guides 31 functioning properly to center the pans. Each pan will contain a single piece of formed dough. If the die members 57 have not been previously treated with flour, the operator moves the die mechanism rearwardly, so as to deposit the dies within flour in the pan 27. The counterweight 52 will tend to move the die mechanism to its upper or vertical position, and from this position the die mechanism is swung forwardly and downwardly so that the dies 57 will enter the respective pans. Further pressure upon the handle 66 will cause the blades to cut through the dough as indicated in Figure 7. The handle is then released and the counterweights 52 will return the die mechanism to its inoperative or vertical position, allowing the operator to remove the pans 65. A new gang of pans and dough may now be placed upon the base for cutting operation, as has been described.

When the pan containing the severed dough is removed from the base, the pans are placed in a steam proofing compartment or room, and it is at this point in the operation that the molecular and fiber displacement of the severed dough occurs.

During the cutting operation, the dough was cut in six individual pieces, each of which has surface adhesion with portions of its pan, i. e., the base, end or side walls, as the case may be. Also where the incision was made in the dough, a thin skin was formed, sealing gases within each piece, and also, the dough was slightly compressed during the cutting operation. During the proofing of the dough pieces, the gases expand and since the line of least resistance is upward in the direction of the incision made by the dies, the gases compacted medially of the dough pieces tend to displace the dough in such direction, and inasmuch as the incisions were made in the dough at an angle to its longitudinal axis, and the further fact that the dough pieces will also partake of an upward rise, a twist will be given each doughpiece, as approximately shown in Figure 10.

The above is applicant's theory of the displacement of the dough during the proofing operation and actual tests have shown that dough so treated and baked, provides a bread having a decided twist of a fine texture, free of excessive or large gas cells.

While I have shown and specifically described a machine for forming pan-twisted bread, this is merely an illustration of one means for carrying out my invention, and I consider as my own all such modifications in structure as fairly fall within the scope of the appended claims.

I claim:

1. In a machine for forming a twisted loaf of dough, a base, support legs thereon, pan centering means on the base comprising adjustable side plates and one adjustable end plate, a flour tray supported by the base positioned parallel to the pan centering means but spaced therefrom, a swingable member on the base positioned between the pan centering means and the tray, said swingable member having a head at its upper free end, the swingable member having an arcuate movement so as to alternately position the head within a pan on the centering means and the flour tray, and said head having cutting blades arranged parallel to one another and at an angle to the longitudinal axis of the head.

2. The structure of claim 1 in which means are associated with the swingable member to releasably hold the member and head in an inoperative position between the pan centering means and the flour tray.

3. The structure of claim 1 in which the swingable member comprises a portion depending below the base, and an adjustable weight thereon for maintaining the swingable member and head in an inoperative position between the pan centering means and the flour tray.

4. In a machine for forming a twisted loaf of dough, a base, support legs thereon, pan centering means on the base comprising laterally adjustable side plates and one adjustable end plate, a flour tray supported by the base positioned parallel to the pan centering means, but spaced therefrom, bearings on the base positioned between the pan centering means and the flour tray, a shaft fixed within the bearings, a pair of arms revolubly mounted on the shaft, a stud shaft freely carried in one end of each arm, plate members connecting the stud shafts, die members mounted on the plate members for adjustment longitudinally of the plate members for registry with pans on the pan centering means, said die members each having cutting blades arranged parallel to one another and at an angle to the longitudinal axis of respective die members, adjustable counterweight means on the other free end of the arms for releasably maintaining the arms in an operative vertical position, and means between the shaft and respective stud shafts for holding the stud shafts against rotative movements.

5. In a machine for forming a twisted loaf of dough, a base, support legs thereon, pan centering means on the base comprising laterally adjustable side plates and one adjustable end plate, a flour tray supported by the base positioned parallel to the pan centering means, but spaced therefrom, bearings on the base positioned between the pan centering means and the flour tray, a shaft fixed within the bearings, said shaft projecting beyond the bearings, an arm rockably mounted on the shaft outwardly of each bearing, a sprocket keyed to respective ends of the shaft, a stud shaft freely carried in one end of each arm, spaced bar members connected between the stud shafts; die members, each die member having a lug for insertion between the plate members, locking means between each lug and the bar members for holding the die members in adjusted position on the bars, each die member having cutting blades arranged parallel to one another and at an angle to the longitudinal axis of the die member, counterweight means on the free end of the arms for releasably maintaining the arms in a vertical position with respect to the base, a sprocket keyed to each stud shaft aligned with the first named sprockets and a chain trained about said sprockets whereby to hold said stud shafts against rotative movement.

6. In a machine for forming a twisted loaf of dough, a base support for a flour tray and a bake pan, a swingable member on the base positioned between the tray and the bake pan, said swingable member having a head at its upper free end, the swingable member having an arcuate movement so as to alternately position the head within the tray and bake pan, and said head having tapered cutting blades arranged parallel to one another and at an angle to the longitudinal axis of the head whereby dough in the bake pan will be severed and compressed into individual pieces of dough.

7. In a machine for forming a twisted loaf of dough, a base support, a member swingably supported upon the base support, said member having a die head thereon adapted to register with and enter a pan on the base support, said head having a plurality of cutting blades, the blades being of tapered formation and arranged parallel to one another and at an oblique angle to the longitudinal axis of the head whereby said blades will sever and compress dough contained within the pan along lines at an angle to the longitudinal axis of the dough.

8. A die for cutting dough into individual pieces of dough comprising an elongated head, tapered cutting blades on the head, arranged parallel to one another and at an oblique angle to the longitudinal axis of the head.

9. The structure of claim 8 in which at least one end of the end blades intersect an end of the head offset from the longitudinal axis thereof.

CARL C. GULDBECH.